(No Model.)
W. J. GORDON & E. D. GILBERT.
SHEET METAL WATER CONDUCTOR.
No. 343,025. Patented June 1, 1886.
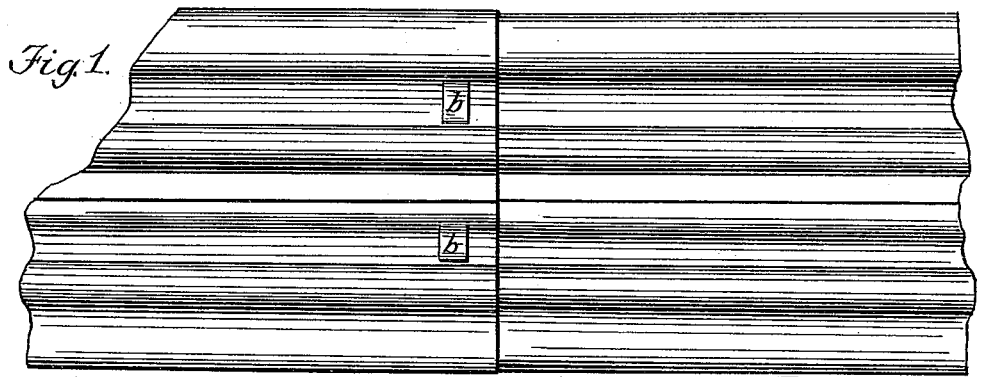
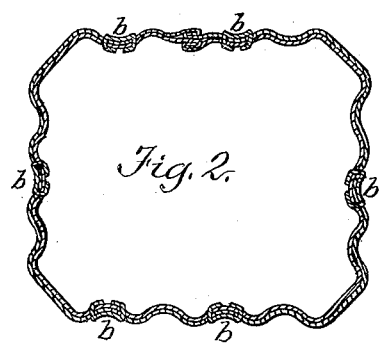
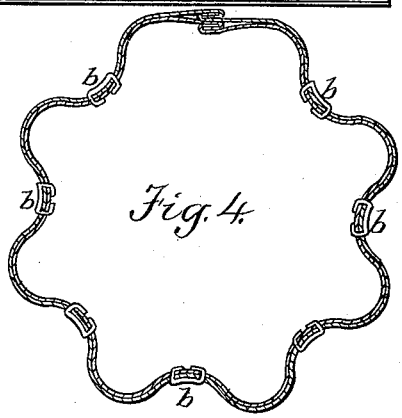
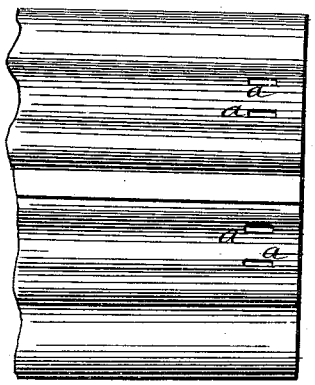
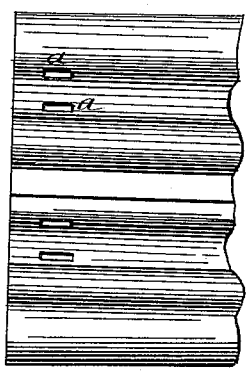
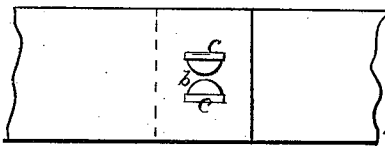
Witnesses:
A. C. Rawlings
W. C. Chaffin
Inventors:
William J. Gordon
Edmund D. Gilbert
by Johnson & Johnson
Attys.

UNITED STATES PATENT OFFICE.

WILLIAM J. GORDON AND EDMUND D. GILBERT, OF PHILADELPHIA, PA.

SHEET-METAL WATER-CONDUCTOR.

SPECIFICATION forming part of Letters Patent No. 343,025, dated June 1, 1886.

Application filed December 19, 1885. Serial No. 186,217. (No model.)

*To all whom it may concern:*

Be it known that we, WILLIAM J. GORDON and EDMUND D. GILBERT, citizens of the United States, residing at Philadelphia, in the county of Philadelphia and State of Pennsylvania, have invented new and useful Improvements in Sheet-Metal Water-Conductors, of which the following is a specification.

Our invention relates to sheet-metal water-conductors used upon buildings for carrying off the rain-water, and particularly to such conductors as are galvanized and joined in short lengths, and formed to yield to internal pressure caused by the expansion produced from the freezing of water therein, and thereby prevent the bursting of the pipe. Hitherto such piping has been made in short lengths, galvanized, and then joined into long lengths by lapping their ends and soldering them together to make the joint water-tight and give a permanent coupling to the lengths.

By our improvement the pipe is made in lengths, lapped at their ends, and permanently coupled by metallic staples or clips. When so joined, however, and then galvanized, the joining is thereby sealed not only at the lapped ends, but at the longitudinal seam, which may be lapped and locked in the ordinary way without solder, thus lessening the cost of the piping and rendering the joining more permanent and satisfactory in preventing leakage and the defacing and damaging of the building.

The drawings represent, in Figure 1, the ends of two pipe-sections in elevation, joined by our improvement; Fig. 2, a cross-section taken through the line of the coupling, showing the slots in the lapped ends to receive the fastening staples or clips. Fig. 3 shows in elevation the ends of the pipe-sections separated, showing the slots; and Fig. 4, cross-sections of modified form of pipe, taken through the line of the clinched staple-couplings. Fig. 5 is one of the metal clinching-staples; and Fig. 6 shows one of the staples clinched over the inward projecting edges of the slots.

The conductor may be of any form in cross-section, either round, angular, or corrugated, and the longitudinal seam is of the usual lap-joint without solder. The lengths are made so as to be lap-joined, and at such lapping they are formed with two slots, $a$ $a$, preferably in the direction with the length of the pipe, punched inward and close enough together to receive a small clinching-staple, $b$, of sheet metal, which, as shown, are clinched on the inner side of the pipe. The ends of the staples are rounded or shaped to readily enter the slots, and being made of the same material as the pipe they are easily clinched on the inner side and flattened down with the inward projecting edges $c$ $c$ of the slots so as to preferably close the edges of the slots, as shown in Fig. 6. The pipe-sections thus coupled are preferably subsequently galvanized, which while preventing rusting also seals the joints of the seam of the end lap and of the staple-fastenings, making the pipe perfectly water-tight without soldering. The punching of the slots must be so that they will be coincident when the pipe ends are lapped, and this slot-punching and the clinching of the staples may be done in any suitable way.

We prefer to place the clinching-staples in the hollows of the corrugations of the pipe when the latter is corrugated, as shown.

An important advantage of our fastening for slip-joined pipes is that each bent end of each staple forms a separate lock for the joined pipe ends, and a separate sealing-cover for each slot in connection with the projecting edges of the punched slot when clinched over, as shown in Fig. 6. The form of the staple not only makes a perfect fastening, a perfect slot-seal, and a double fastening for each end of the pipe alike, but, being made of thin sheet metal, affords little projection on the outer surface of the pipe for the collection of dirt.

The staples may be made of waste scraps and cut and swaged to proper shape and size, and when inserted to couple the pipe-sections the ends stand so as to be turned down with the projecting edges of the slots.

The sheet-metal water-conductors now furnished the trade are made by soldering the pipe ends, and the expansion or contraction of the metal breaks the soldered joint and allows the pipe to leak. This objection our improvement overcomes, as the staple-fastenings will expand and contract with the metal, and always keep the joint tight.

We have stated that the punching of the slots forms inward projections c c, and as both laps are punched at once the metal of the outer lap will lock with the slot of the inner lap, and the staple being put in place its ends will project inward between and beyond the edge projections, so that when the clinching is made under pressure the ends of the staples and the projecting edges of the slots will be crushed flat alike in the locking and sealing of the slots.

Sheet metal is supplied to the trade in various-sized sheets, and it is necessary to unite several pieces to form lengths or sections of pipe to meet the demands of the trade, such pipe-sections being comparatively short and galvanized, as they cannot be solder-joined and galvanized afterward, for the reason that the hot bath of zinc would melt the solder and render the sections liable to separate or become out of line.

Our improvement allows any number of short pipe-sections to be joined and then galvanized, the same as a single section, thus giving the trade longer galvanized lengths, much stronger pipe, and a perfectly water-tight pipe. From these reasons we are enabled to furnish the trade with a better and a cheaper article, and the means by which the sections are joined also serve to seal the openings provided for the joining-staples.

By our improvement the same operation by which the joined pipe-sections are galvanized also seals the longitudinal pipe-joints, the end lap pipe-joints, and the fastening-staple joints, which advantage cannot be gained by galvanizing the short pipe-sections.

We claim—

A sheet-metal water-conductor formed of two or more sections lap-joined and fastened by sheet-metal staples, clinched on the inner side of the laps, and galvanized in their joined lengths, sealing alike the pipe and the staple joints, as shown and described.

In testimony whereof we have hereunto set our hands in the presence of two subscribing witnesses.

WILLIAM J. GORDON.
EDMUND D. GILBERT.

Witnesses:
FRANK WANDSLEBER,
CHARLES OTTO.